Sept. 12, 1967     P. I. VIDAL     3,340,909

SAWING MACHINE AND METHOD

Filed Feb. 9, 1965     2 Sheets-Sheet 1

Inventor
Paul I. Vidal
By Cushman, Darby & Cushman
Attorneys

Sept. 12, 1967 P. I. VIDAL 3,340,909

SAWING MACHINE AND METHOD

Filed Feb. 9, 1965 2 Sheets-Sheet 2

Inventor
Paul I. Vidal
By Cushman, Darby & Cushman
Attorneys

# United States Patent Office 3,340,909
Patented Sept. 12, 1967

3,340,909
SAWING MACHINE AND METHOD
Paul I. Vidal, Villepinte, France, assignor to Rocma Anstalt, Vaduz, Liechtenstein, a corporation of Liechtenstein
Filed Feb. 9, 1965, Ser. No. 431,275
Claims priority, application France, Feb. 13, 1964, 963,634
4 Claims. (Cl. 143—47)

This invention relates to the sawing of boards, panels, slabs and analogous elements of flat form and compact consistency, hereinafter (and in the claims) generically referred to as "board."

Many different types of manual and automatic machinery are in existence for the cutting or sawing of boards. Usually, the cutting tool, such as a rotary saw, is operated to cut through the board in a single pass.

This invention is based on a recognition that such a cutting procedure frequently causes defects at the surface of the board. Specifically, the board surface remote from the surface into which the cutting tool engages tends to become flaked or splintered as the cutting tool emerges from it. The defects are especially common and objectionable in the case of board made from expanded synthetic plastic materials, and of laminated board of the sandwich type including a relatively soft inner layer and harder outer layers.

Objects of this invention include the provision of improved method and machinery for sawing through boards, panels, and the like, while completely eliminating the danger of flaking or otherwise damaging its outer surfaces; and to provide machinery for that purpose which will be simple, effective and reliable and amenable to complete or near-complete automation.

Basically, a sawing machine according to the invention utilizes the process which comprises: cutting a kerf extending part-way of the thickness dimension of the board from one side of the board, and cutting through the remaining depth of the board from the opposite side.

It will be evident that this simple procedure entirely does away with the danger of flaking and splintering, since the cutting tool does not emerge from either face of the board.

Machinery according to the invention may generally comprise means supporting a board, sawing means, means defining a first working path for said sawing means across one side of the board, means defining a second working path for said sawing means across the opposite side of the board, said paths lying in a common plane transverse to the board, means for traversing the sawing means over said first working path while operating the sawing means to cut partly into the board from said first side, and means for traversing the sawing means over said second active path in a manner delayed with respect to said first traverse, while operating the sawing means during said second traverse so as to cut the remaining distance through the board.

The sawing means may include two separate sawing units traversable over said respective active paths in mutually displaced relation, i.e., with one saw unit leading with respect to the other.

Alternatively the sawing means may comprise a single sawing unit adapted to be traversed successively and continuously first over the first active path and then over the second.

The objects, features and advantages of the invention will be more clearly understood from the ensuing description and the accompanying drawings given by way of illustration but not of limitation, and wherein.

Figure 1:
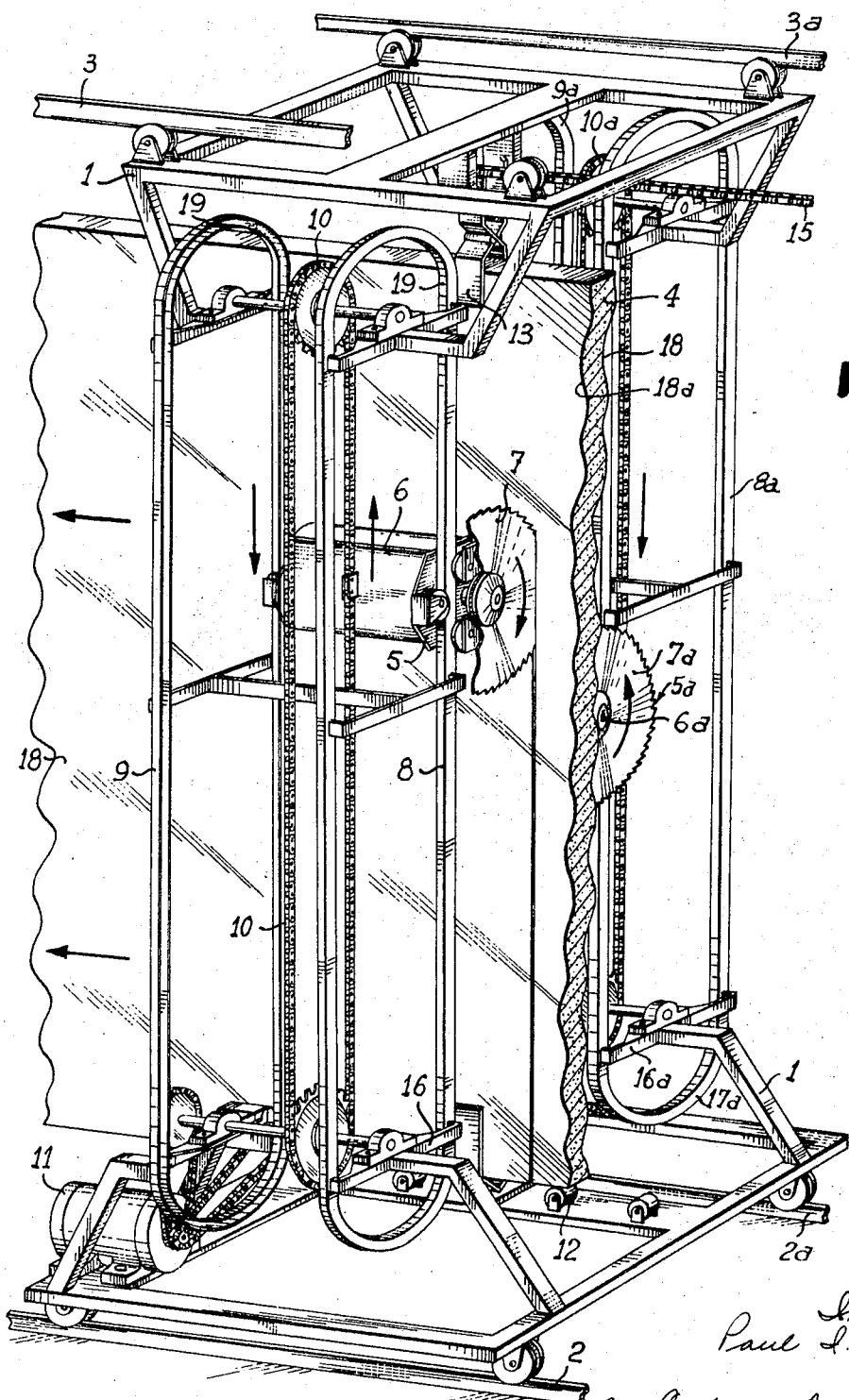
FIG. 1 is a partial perspective view, simplified, showing the principal components of a first embodiment of the invention utilizing two rotary saw units.

The sawing machine illustrated in FIG. 1 comprises a movable frame or carriage 1 provided with lower and upper sets of rollers engaging the lower tracks 2 and 2a, and upper tracks 3 and 3a. A board, slab or panel 4 to be sawn is arranged vertically for movement in a symmetrical position between the tracks as shown. The lower longitudinal edge of board 4 engages a runway comprising a series of rollers 12 mounted on a supporting strip between the lower tracks 2 and 2a. Part of an endless feeder chain 15 extends by way of suitable guide means not shown, between and adjacent to the upper tracks 3 and 3a parallel with said tracks, and there are provided suspension clamps such as 13 having their upper ends attached to spaced points of the chain 15 and having their depending clamping portions engaging the upper edge of the panel 4. Desirably, conventional electromagnetic means, not shown, may be used for remotely actuating the clamps 13 between their open and closed conditions. Lower clamps such as 14 are preferably also provided, engageable with the lower edge part of the panel and these may cooperate with a lower feed chain, not shown, similar to chain 15.

The carriage 1 supports a pair of similar and opposed sawing units 5 and 5a which are traversable vertically across the carriage so as to cut into the opposite sides of the board 4 as shown. Sawing unit 5 comprises an electric motor 6 and a rotary circular saw 7 secured to the motor shaft. The casing of motor 6 is supported by means of rollers as indicated for traversing movement along the vertical inner sides of a pair of endless rails 8 and 9 arranged in two parallel spaced vertical planes, and each including in addition to said straight vertical inner side just mentioned, a straight vertical outer side, and semicircular top and bottom interconnecting portions as illustrated, whereby the sawing unit 5 can accomplish a full rotation about the endless tracks 8 and 9. An endless drive chain 10 is trained at its top and bottom about a pair of sprocket gears secured on shafts coaxial with the semicircular top and bottom portions of the rails 8 and 9, said chain 10 having a point attached to the motor casing 6. The lower sprocket shaft of chain 10 is drivingly connected, e.g., through the chain means shown, to an electric motor 11 mounted on the base of carriage 1, so that operation of motor 11 will cause the sawing unit 5 to circulate about the endless rails 8 and 9 as indicated above.

The opposite sawing unit 5a is constructed and arranged in a manner exactly similar to that of sawing unit 5.

In operation, the carriage 1 is initially stationary at a predetermined starting station along the tracks 2–3, and both sawing units 5 and 5a are positioned near the lowermost extremity of their respective tracks 8–9 and 8a–9a. However, as will be clear presently, there always is a constant, predetermined displacement during operation between the two sawing units along their vertical tracks; in the example, the sense of this displacement is such that the sawing unit 5a always remains somewhat lower than unit 5 during the sawing stroke. Accordingly, in the initial condition just referred to, sawing unit 5a is positioned somewhere along the lower semi-circular end part of the associated tracks, such initial location being indicated by the approximate point 17a.

A board 4 to be cut is fed by means of the feeder chain 15 from a point situated, e.g., leftward of the drawing. When the board has reached a predetermined position relative to the starting station at which the carriage 1 is located, said position being determinable in dependency on the prescribed length of board to be cut, adjustable stop means, not shown, which may be supported from the chain 15, such as the clamps 13–14, engage cooperating stops of the carriage 1, so that the latter is now carried along with the movement of the board. At the same time, the electric motors 6, 6a and 11 are started in operation through the automatic closure of switch means, not shown.

Both sawing units 5 and 5a are hence started in rotation and are simultaneously caused to advance upwardly along the inner vertical stretches of their respective ways 8–9 and 8a–9a, in a common vertical plane normal to the plane of board 4, with a constant vertical displacement being maintained between the two sawing units. To maintain this constant displacement, any suitable type of mechanical coupling, not shown, may be provided between the drive chains 10 and 10a.

It will be understood that suitable transverse locating means are provided for accurately positioning the board 4 in a direction normal to its general plane, with respect to the carriage 1 and the sawing unit supporting means thereon. Said transverse locating means may consist of, or include, the clamps 13 and 14, and are preferably adjustable. Further, adjusting means are preferably provided for varying the effective transverse distance between the two sawing units. The adjustments are so made that the saw wheel 7 of the leading cutting unit, i.e., the unit, here 5, which is leading during the upward working traverse, does not cut completely through the thickness of the board 4, but leaves a substantial part of said board thickness uncut; for example the saw 7 may be arranged to cut to about half the thickness of the board. The trailing unit 5a is adjusted to complete the cut.

It is found that with such an arrangement, an extremely smooth and regular sawcut is formed through even the more brittle boards, without any danger of flaking or splintering of the board surface.

When the sawing units 5 and 5a in their upward travel have reached respective positions, near the uppermost arcuate end parts 19, of their respective ways, such that the trailing saw unit 5a has cleared the upper edge of the board 4, the saw motors 6, 6a may be switched off. Motors 11 however continue energized so as to cause both saw units 5, 5a to accomplish a full revolution about their respective endless ways, and return to their initial positions.

The sawn-off length of board may be removed manually or mechanically as desired, after the clamps 13 and 14 have first been disengaged. The carriage 1 is returned to its initial position at the starting station in any appropriate way, manually or more preferably by some simple mechanical device such as counterweights, not shown.

Figure 2:
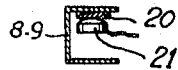
FIG. 2 is a cross sectional view on the line II—II, FIG. 1.

As indicated in FIG. 2, the saw motors 6, 6a may be energized through slider contacts such as 21 carried by said motors and frictionally engaging conductive strips 20 extending along inner surfaces of the vertical ways, such as 8, which are channel-shaped. The strips 20 extend only over the inner sides of the endless tracks 8–9, so that the rotary saws will be operated only during the upward vertical traverse stroke of the saw units 5, 5a.

Figure 3:
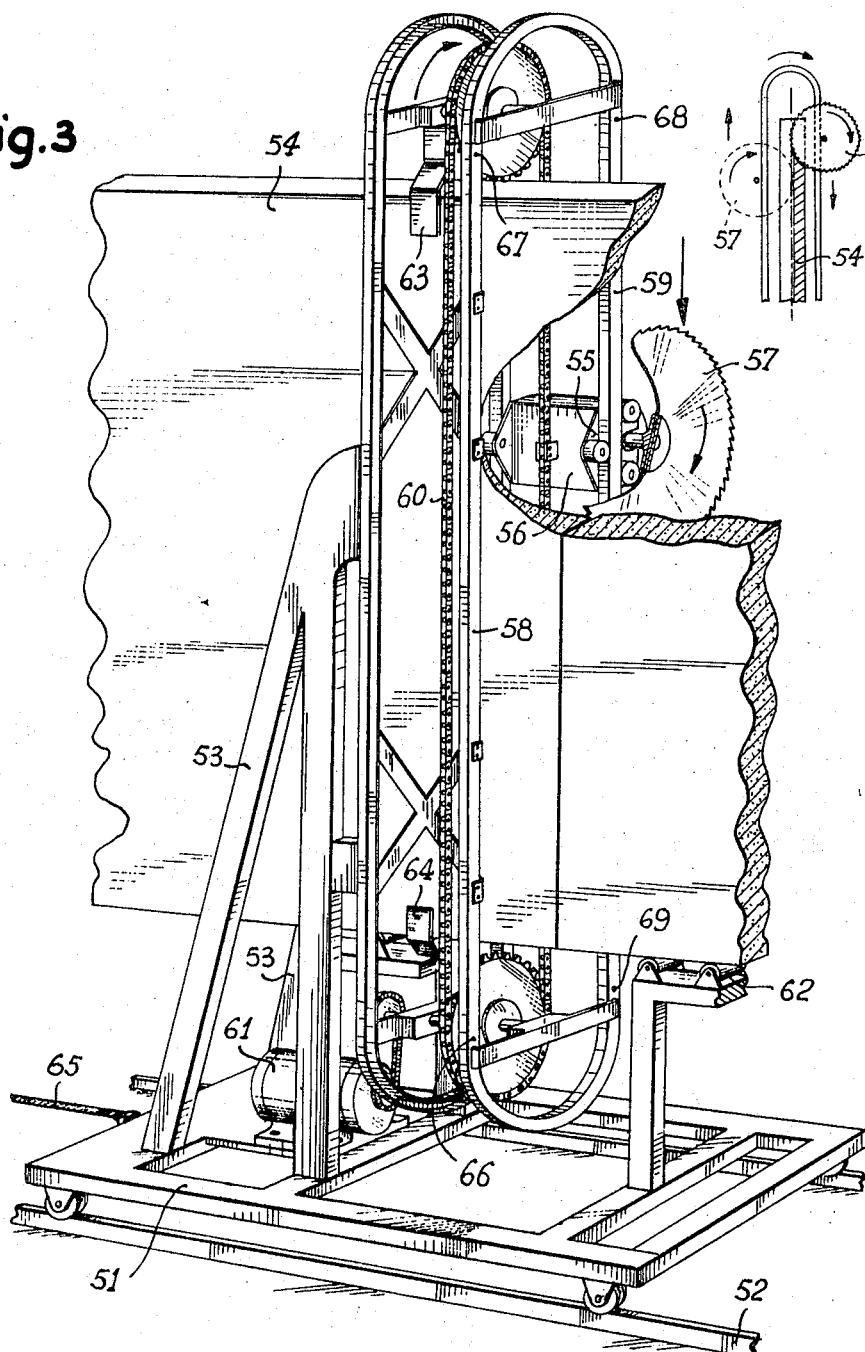
FIG. 3 is a perspective view, generally similar to FIG. 1, illustrating a simplified embodiment of the invention using a single sawing unit.
Figure 4:
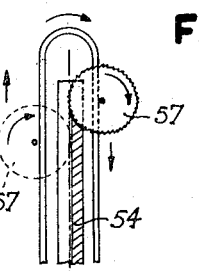
FIG. 4 is a small-scale diagrammatic view showing the upper part of the machine of FIG. 3 for explaining the operation thereof.

FIGS. 3 and 4 illustrate a modification of the invention which is simpler than that of FIGS. 1 and 2 in that a single sawing unit is provided. The machine comprises a flat carriage or truck 51 provided with rollers running on a single pair of lower tracks 52. Truck 51 carries a pair of laterally spaced upstanding support frames 53. These frames serve to support between them an endless track structure which is composed of two similar loops disposed in longitudinally spaced, transverse vertical planes, each loop including the two straight vertical sides 67 and 68, interconnected by top and bottom semi-circular connecting portions. The single sawing unit 55 includes the electric motor 56 and saw wheel 57 driven by it, and the casing of the motor 56 is provided with rollers, as shown, by way of which the sawing unit 55 can travel around the endless tracks. An endless drive chain 60 has a point attached to the motor casing 56 and its trained about upper and lower sprockets, the lower sprocket being rotatable from an electric motor 61 mounted on truck 51.

The board or panel 54 to be cut is fed over rollers 62, through means not shown which may include a feed chain similar to chain 15 in FIG. 1, so as to pass vertically through both loops defined by the endless vertical tracks 67–68. As in the first embodiment, upper and lower clamps 63 and 64 are provided, supported from the structures 53, and may be operated to clamp the panel 54 in position when the board has reached a predetermined longitudinal position with respect to the starting station at which the carriage 51 is initially located. The clamps 63, 64 may simultaneously serve to locate the board 54 in the desired position transversely of the carriage. A rope 65 is attached to one end of the truck 65 and serves to haul back the carriage to the starting station after a cutting operation has been completed. Rope 65 may be operated by simple counterweight means, not shown.

In the operation of this embodiment, which is illustrated in the diagrammatic view of FIG. 4, it will be understood that the sawing unit 55 is initially positioned at the foot of the vertical tracks. As the board 54 reaches a predetermined longitudinal position, clamps 63 and 64 are closed, so that truck 51 advances over the tracks 52 bodily with the panel 54. At the same time motors 61 and 55 are energized causing the sawing unit 55 to rotate and travel upwards, say over the straight stretch 58 of the vertical tracks. The positional adjustments may be such that the cutter wheel 57 cuts into the board 54 a distance just over one half the thickness of the board, as indicated in FIG. 4. On reaching the top of the endless track, the unit 55 travels around the semi-circular upper portion, as indicated by the arrow, and descends along the opposite straight stretch of the loop; the saw wheel 57 now cuts into the board 54 from the opposite side surface, a depth sufficient to cause the board to be cut through completely. On reaching the lower end of the track, motors 56 and 61 are both stopped. Clamps 63 and 64 are opened, the board section sawn off is removed, and truck 51 hauled back to its starting position by means of rope 65.

The apparatus of FIG. 3 gives excellent results in providing a clean cut without splintering and flaking of the board surfaces. However, in the case of more brittle and fragile boards, the dual sawing unit of FIGS. 1–2 is preferred.

The invention may be embodied in various other forms. For example, the arrangement may be such that the board is fed in a horizontal plane, and the sawing means are traversed above and below that plane. As another modification, the sawing units, instead of being circulated continuously around endless tracks as in FIG. 1, may be arranged to travel up and down over a single vertical pair of tracks, the tracks being supported on a stand capable of transverse horizontal movement between an operative inner position, and an outer position in which the sawing unit does not engage the board, for the return movement. Various other modifications will occur.

What I claim is:

1. Apparatus for cutting off lengths of board, which comprises means supporting the board, sawing means, means defining a first path for said sawing means across one side of the board, means defining a second path for said sawing means across the opposite side of the board, said paths lying in a common plane transverse to the board, means for traversing the sawing unit over said first path and for operating the sawing means to cut partly into the board from said first side thereof, and means for traversing the sawing means over said second path in a manner delayed with respect to said first traverse and for operating the sawing means during said second traverse so as to cut the remaining distance through the board; and a carriage movable on tracks in a direction longitudinal with respect to the board, said sawing means being supported from the carriage, means for feeding the board in said longitudinal direction, and means for blocking the movement of said carriage with that of said board during a sawing operation.

2. Apparatus as defined in claim 1, including endless track means mounted on said carriage and supporting said sawing means for continuous circulation therearound and for traversing displacement over said first and second paths.

3. Apparatus for cutting board, comprising means supporting the board, a first and a second sawing units, means defining a first path for the first sawing unit across one side of the board, means defining a second path for the second sawing unit across the opposite side of the board, said paths lying in a common plane transverse to the board, means for traversing the first sawing unit over said first path and for operating the first unit to cut partly into said board from said first side thereof, and means for traversing the second sawing unit over said second path in a manner delayed with respect to said first traverse and for operating the second sawing unit during said traverse thereof so as to cut the remaining distance through the board; and respective endless track means mounted on the carriage on opposite sides from said board, each endless track means including one side supporting a related sawing unit for working traverse over the related first or second path, and another side supporting the said unit for its return traverse back to an initial point of said related path.

4. Apparatus for cutting board, comprising means supporting the board, a sawing unit, means defining a first and a second paths for said unit across opposite sides of the board said paths lying in a common plane transverse to the board, means for traversing the sawing unit over said first path and for operating it to cut into said board from said first side thereof, and for then continuously traversing said unit over said second path and for operating it to cut the remaining distance through the board; and an endless track mounted on said carriage and having straight opposite sides surrounding the board and supporting the sawing unit for its working traverse first over said one path then over said second path and back to an initial point of said first path.

References Cited
UNITED STATES PATENTS 1,645,924 10/1927 Palmigiano _____ 143—47
2,664,926 1/1954 Fuglie _____ 143—40 X
2,741,277 4/1956 Leger.

WILLIAM W. DYER, Jr., *Primary Examiner.*

W. D. BRAY, *Assistant Examiner.*